(12) United States Patent
Park

(10) Patent No.: US 8,872,900 B2
(45) Date of Patent: Oct. 28, 2014

(54) IMAGE DISPLAY APPARATUS AND METHOD FOR OPERATING THE SAME

(75) Inventor: Sungwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 667 days.

(21) Appl. No.: 12/823,776

(22) Filed: Jun. 25, 2010

(65) Prior Publication Data

US 2011/0018976 A1 Jan. 27, 2011

Related U.S. Application Data

(60) Provisional application No. 61/220,581, filed on Jun. 26, 2009.

(51) Int. Cl.
*H04N 13/04* (2006.01)
*H04N 13/00* (2006.01)

(52) U.S. Cl.
CPC .... *H04N 13/0018* (2013.01); *H04N 2013/0081* (2013.01); *H04N 13/007* (2013.01)
USPC .................. 348/51; 348/42; 348/43; 345/419

(58) Field of Classification Search
CPC ............ H04N 13/0018; H04N 13/007; H04N 13/0048; H04N 13/0066; H04N 13/004; H04N 21/816; H04N 13/0059; H04N 13/0438; H04N 13/0055; H04N 21/23614; H04N 2213/005; H04N 5/775; H04N 13/00; H04N 13/0022; H04N 2213/003; H04N 2013/0465
USPC ..................... 348/42, 47, 48, 51, 56; 345/419
See application file for complete search history.

(56) References Cited

U.S. PATENT DOCUMENTS

| 6,445,814 | B2 * | 9/2002 | Iijima et al. | 382/154 |
| 6,525,699 | B1 * | 2/2003 | Suyama et al. | 345/6 |
| 7,154,473 | B2 * | 12/2006 | Kim | 345/157 |
| 7,551,770 | B2 * | 6/2009 | Harman | 382/154 |
| 7,876,954 | B2 * | 1/2011 | Kim et al. | 382/154 |
| 8,111,906 | B2 * | 2/2012 | Song et al. | 382/154 |
| 2007/0136681 | A1 * | 6/2007 | Miller | 715/782 |
| 2008/0246759 | A1 | 10/2008 | Summers | |
| 2008/0297591 | A1 | 12/2008 | Aarts et al. | |
| 2009/0142041 | A1 * | 6/2009 | Nagasawa et al. | 386/124 |

FOREIGN PATENT DOCUMENTS

| CN | 1894961 A | 1/2007 |
| CN | 101208723 A | 6/2008 |
| CN | 101312539 A | 11/2008 |
| EP | 1217684 A2 | 6/2002 |
| JP | 2005-250978 A | 9/2005 |
| WO | WO 2008/126200 A1 | 10/2008 |

* cited by examiner

*Primary Examiner* — Sath V Perungavoor
*Assistant Examiner* — Nathnael Aynalem
(74) *Attorney, Agent, or Firm* — Birch, Stewart, Kolasch & Birch, LLP

(57) ABSTRACT

An image display apparatus and a method for operating the same are disclosed. The method for operating an image display apparatus includes receiving an image including at least one three-dimensional (3D) object, calculating a depth value of the at least one 3D object, changing at least one of sharpness and brightness of pixels corresponding to the at least one 3D object according to the depth value and generating an output image including the changed at least one 3D object, and displaying the output image.

16 Claims, 15 Drawing Sheets

|              | COLOR  | CONTRAST | SHARPNESS |
|--------------|--------|----------|-----------|
| Z=1          | Weak ↕ | low ↕    | low ↕     |
| Z=2~300      |        |          |           |
| Z=301~600    |        |          |           |
| Z=601~1000   | Strong | High     | High      |

| RIGHT → LEFT | SHIFT VALUE | 0~10 | 10~20 | 20~30 | 30~40 | 40~50 | 50 OR ABOVE |
|---|---|---|---|---|---|---|---|
| | DEPTH INFORMATION | 0 | 1 | 2 | 3 | 4 | 5 |
| LEFT → RIGHT | SHIFT VALUE | 0~10 | 10~20 | 20~30 | 30~40 | 40~50 | 50 OR ABOVE |
| | DEPTH INFORMATION | 0 | -1 | -2 | -3 | -4 | -5 |

IMAGE DISPLAY APPARATUS AND METHOD FOR OPERATING THE SAME

CROSS-REFERENCE TO RELATED APPLICATION

This application claims the benefit of U.S. Application No. 61/220,581, filed on Jun. 26, 2009, in the USPTO, the disclosure of which is incorporated herein by reference.

BACKGROUND OF THE INVENTION

1. Field of the Invention

The present invention relates to an image display apparatus capable of displaying three-dimensional (3D) images and a method for operating the same, and more particularly, to an image display apparatus and a method for operating the same, which can enhance a sense of depth or a sense of perspective perceived to a user by controlling factors other than the disparity between the left-eye and right-eye images of a 3D image.

2. Description of the Related Art

An image display apparatus has a function of displaying images viewable to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting such as robustness against noise, less data loss, ease of error correction, and the ability to provide high-definition, clear images. Digital broadcasting also allows interactive services for viewers.

Many studies have recently been conducted on 3D imaging and stereoscopy is being widely accepted and popular in computer graphics and other various environments and technologies. 3D images can be transmitted by digital broadcasting and an apparatus for reproducing digital 3D images is under development.

SUMMARY OF THE INVENTION

Therefore, the present invention has been made in view of the above problems, and it is an object of the present invention to provide an image display apparatus and a method for operating the same, which can enhance the illusion of 3D perceived to a user during 3D imaging.

It is another object of the present invention to provide an image display apparatus and a method for operating the same, which can enhance relative senses of perspective that a user feels from objects included in a 3D image by compensating the 3D image with a simple computation or controlling a display, based on an illusion effect.

In accordance with an aspect of the present invention, the above and other objects can be accomplished by the provision of a method for operating an image display apparatus, including receiving an image including at least one 3D object, calculating a depth value of the at least one 3D object, changing at least one of sharpness and brightness of pixels corresponding to the at least one 3D object according to the depth value and generating an output image including the changed at least one 3D object, and displaying the output image.

In accordance with another aspect of the present invention, provided herein is an image display apparatus including a video signal receiver for receiving an image including at least one 3D object, a controller for calculating a depth value of the at least one 3D object, changing at least one of sharpness and brightness of pixels corresponding to the at least one 3D object according to the depth value, and generating an output image including the changed at least one 3D object, and a display for displaying the output image.

BRIEF DESCRIPTION OF THE DRAWINGS

The above and other objects, features and other advantages of the present invention will be more clearly understood from the following detailed description taken in conjunction with the accompanying drawings, in which:

FIG. 9 illustrates an image quality parameter table for use in operating the image display apparatus according to an exemplary embodiment of the present invention;

DETAILED DESCRIPTION OF THE PREFERRED EMBODIMENTS

Exemplary embodiments of the present invention will be described below with reference to the attached drawings.

The terms "module", "portion", and "unit" attached to describe the names of components are used herein to help the understanding of the components and thus they should not be considered as having specific meanings or roles. Accordingly, the terms "module" and "portion" may be interchangeable in their use.

Figure 1:
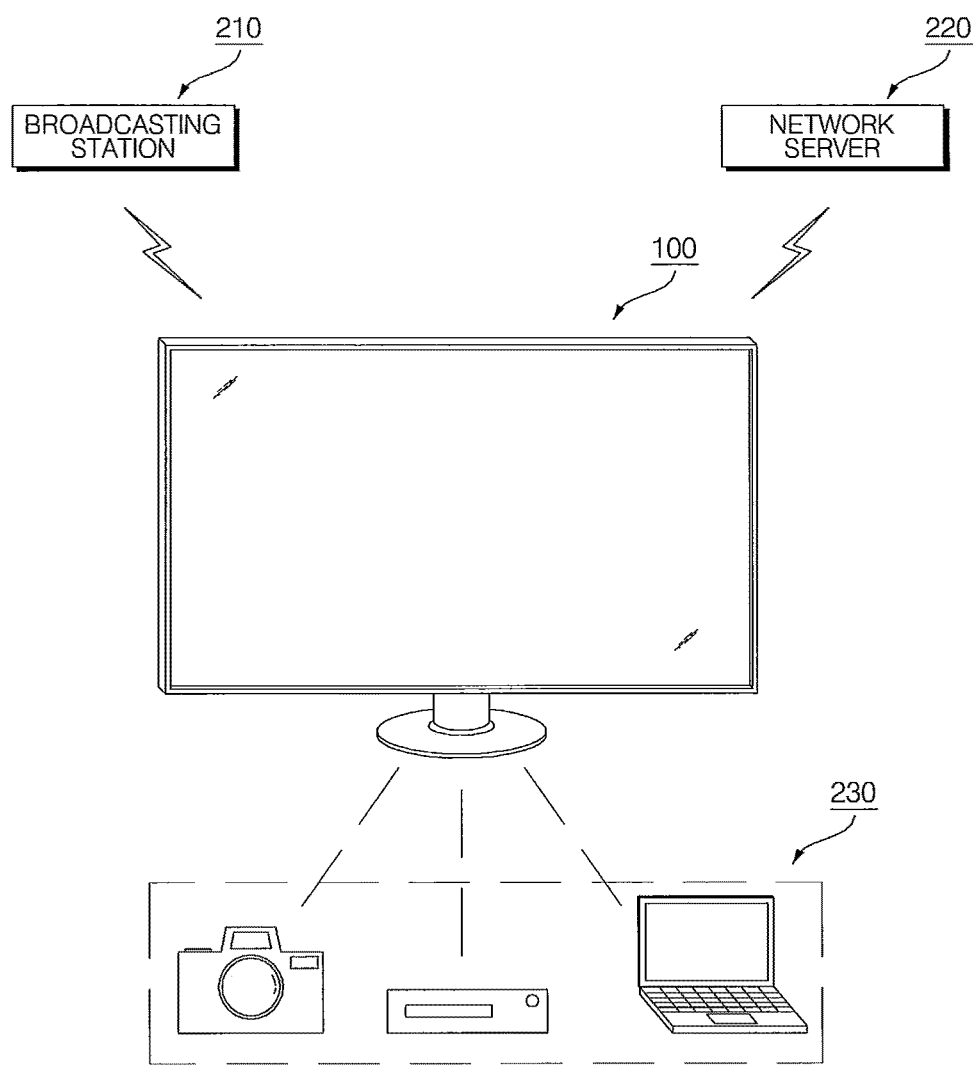
FIG. 1 is a block diagram of an image display system according to an exemplary embodiment of the present invention.

FIG. 1 is a block diagram of an image display system according to an exemplary embodiment of the present invention.

Referring to FIG. 1, an image display apparatus 100 according to an exemplary embodiment of the present invention may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, to be suitable for being output from the image display apparatus 100. The image display apparatus 100 may output images or sound based on the processed video or audio signal.

Meanwhile, the image display apparatus 100 may communicate with the network server 220. The network server 200 is a device that transmits and receives signals to and from the image display apparatus 100 over a network. For example, the network server 220 may be a portable terminal that can be connected to the image display apparatus 100 through a wired or wireless base station. In addition, the network server 200 may provide contents to the image display apparatus 100 over the Internet. A content provider may provide contents to the image display apparatus 100 through the network server 220.

The image display apparatus 100 may communicate with the external device 230. The external device 230 can transmit and receive signals directly to and from the image display apparatus 100 wirelessly or by cable. For instance, the external device 230 may be a medium storage or a player. That is, the external device 230 may be any of a camera, a DVD, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230, and a signal received from the external device 230 to the broadcasting station 210 or the network server 220. That is, the image display apparatus 100 may transmit contents included in signals received from the broadcasting station 210, the network server 220, and the external device 230, as well as reproduce them directly.

Figure 2:
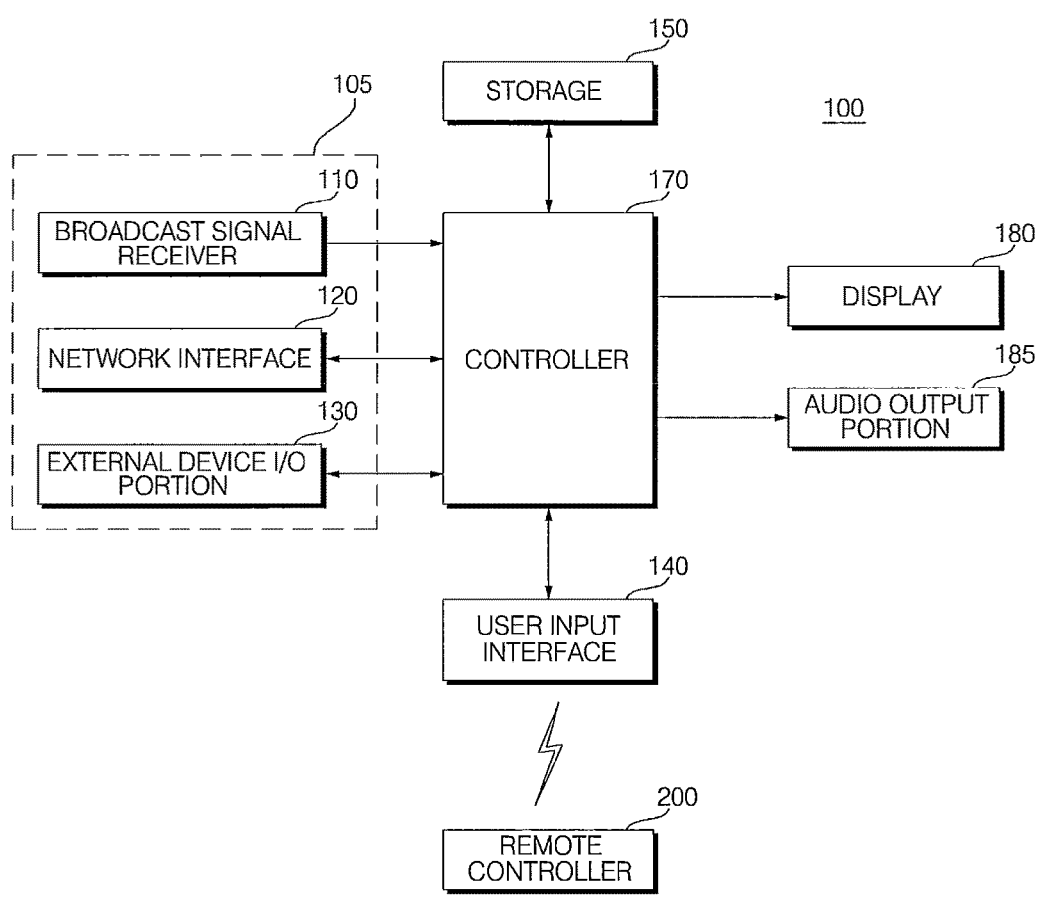
FIG. 2 is a block diagram of an image display apparatus according to an exemplary embodiment of the present invention.

FIG. 2 is a block diagram of the image display apparatus according to an exemplary embodiment of the present invention.

Referring to FIG. 2, the image display apparatus 100 may include a video signal receiver 105, a user input interface 140, a storage 150, a controller 170, a display 180, and an audio output portion 185 according to an exemplary embodiment of the present invention. The video signal receiver 105 has a broadcast signal receiver 110, a network interface 120, and an external device Input/Output (I/O) portion 130. The video signal receiver 105 receives a video signal corresponding to contents to be played back in the image display apparatus 100 from an external device or a network.

The broadcast signal receiver 110 may select a Radio Frequency (RF) broadcast signal corresponding to a channel selected by a user from among a plurality of RF broadcast signals received through an antenna from a broadcasting station (e.g. the broadcasting station 210 in FIG. 1) or an RF broadcast signal corresponding to each of pre-memorized channels, and downconverts the RF broadcast signal to a digital Intermediate Frequency (IF) signal or an analog baseband Audio/Video (A/V) signal.

The broadcast signal receiver 110 may be able to receive RF broadcast signals from an Advanced Television Systems Committee (ATSC) single-carrier system or from a Digital Video Broadcasting (DVB) multi-carrier system. The broadcast signal receiver 110 may sequentially select RF broadcast signals corresponding to all broadcast channels previously memorized in the image display apparatus 100 by a channel-add function among from a plurality of RF signals received through the antenna, and may downconvert the selected RF broadcast signals to IF signals or baseband A/V signals. This operation is performed for the purpose of displaying a thumbnail list of thumbnail images corresponding to broadcast channels on the display 180. Therefore, the broadcast signal receiver 110 may receive RF broadcast signals of the selected channels or the pre-memorized channels, sequentially or periodically.

The network interface 120 interfaces between the image display apparatus 100 and a wired/wireless network such as the Internet or a network server of the wired/wireless network (e.g. the network server 220 in FIG. 1). The network interface 120 may include a wireless communication module for connecting the image display apparatus 100 wirelessly to the Internet. For the wireless Internet connection, the network interface 120 may operate in conformance with communication standards such as Wireless Local Area Network (WLAN) (i.e. Wi-Fi), Wireless Broadband (WiBro), World Interoperability for Microwave Access (WiMax), or High Speed Downlink Packet Access (HSDPA).

The network interface 120 may receive contents or data from a content provider or a network provider over a network. The received contents or data may include contents such as movies, games, Video-on-Demand (VoD) files, and broadcast signals, and information related to the contents. The network interface 120 may also receive update information and update files of firmware from the network operator.

The network interface 120 may be connected to a communication network, for a video call or a voice call. The communication network may be any of a broadcasting communication network connected by LAN, a Public Switched Telephone Network (PSTN), and a mobile communication network.

The external device I/O portion 130 may interface between an external device (e.g. the external device 230 in FIG. 1) and the image display apparatus 100. For the interfacing, the external device I/O portion 130 may include an A/V I/O portion (not shown) or a wireless communication module (not shown).

The external device I/O portion 130 may be connected wirelessly or wiredly to an external device such as a DVD, a Blu-ray disc, a game player, a camera, a camcorder, or a computer (e.g. a laptop computer). Then, the external device I/O portion 130 receives video, audio, and/or data signals from the external device and transmits the received external input signals to the controller 170. In addition, the external device I/O portion 130 may output video, audio, and/or data signals processed by the controller 170 to the external device.

To provide the video and audio signals received from the external device to the image display apparatus 100, the A/V I/O portion may include at least one of an Ethernet port, a Universal Serial Bus (USB) port, a Composite Video Banking Sync (CVBS) port, a component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device I/O portion 130 may wirelessly communicate with other external devices. The image display apparatus 100 may be connected to other external devices and networks in compliance with communication standards such as Bluetooth, Radio-Frequency IDentification (RFID), InfraRed Data Association (IrDA), Ultra WideBand (UWB), or ZigBee.

The external device I/O portion 130 may be connected to various set-top boxes through at least one of the Ethernet port, the USB port, the CVBS port, the component port, the S-video port, the DVI port, the HDMI port, the RGB port, and the D-sub port and may thus receive data from or transmit data to the various set-top boxes.

For example, in case of an Internet Protocol (IP) TV (IPTV) set-top box, the external device I/O portion 130 may provide a video, audio, and/or data signal processed by the IPTV set-top box to the controller 170, for interactive communication. The external device I/O portion 130 may also transmit signals processed by the controller 170 to the IPTV set-top box.

Depending on the types of transmission networks, an IPTV may refer to Asynchronous Digital Subscriber Line-TV (ADSL-TV), Very high data rate Digital Subscriber Line-TV (VDSL-TV), Fiber To The Home-TV (HTTH-TV), TV over DSL, Video over DSL, TV over IP (TVIP), Broadband TV (BTV), etc. In addition, the IPTV may cover Internet TV and full browsing TV in its meaning.

The image display apparatus 100 may be controlled by a signal received from a remote controller 200. For example, the user may input commands such as a power-on/off command, a channel up/down command, and a volume up/down command to the image display apparatus 100 by use of the remote controller 200. The remote controller 200 then transmits a signal carrying a command corresponding to a user manipulation to the image display apparatus 100. The image display apparatus 100 identifies the signal received from the remote controller 200 and generates a control signal or performs an operation according to a command included in the signal.

The remote controller 200 may transmit a signal to the image display apparatus 100 by IR communication. In addition, the remote controller 200 may transmit or receive a signal to or from the image display apparatus 100 based on any other wireless communication standard. The remote controller 200 may be configured so as to sense a user's motion and transmit a signal carrying a command corresponding to the sensed user's motion to the image display apparatus 100. In accordance with an exemplary embodiment of the present invention, the remote controller 200 is assumed to be a spatial remote controller, by way of example. A typical wired/wireless mouse, an air mouse, a pointer, or a remote controller shaped like a ring, a bracelet, a thimble, or the like is available as the remote controller 200. The user input interface 140 may include a wireless communication module for wirelessly transmitting and receiving signals to and from the remote controller 200 and a coordinate calculator for calculating the coordinates of a target position to which a pointer should be shifted in correspondence with a movement of the remote controller 200. The user input interface 140 may wirelessly transmit and receive signals to and from the remote controller 200 through an RF module. Also, the user input interface 140 may wirelessly receive signals from the remote controller 200 through an IR module according to an IR communication standard.

The coordinate calculator of the user input interface 140 may correct handshakes or errors in the signal corresponding to the movement of the remote controller 200 received through the wireless communication module of the user input interface 140. After the correction of handshakes or errors, the coordinate calculator may calculate the coordinates of the target position at which the pointer should be displayed on the display 180.

The controller 170 may identify information about a movement or key manipulation of the remote controller from a signal received from the remote controller 200 through the user input interface 140 and thus may generate and output a control signal based on the information in order to control an operation of the image display apparatus 100.

In another example, the remote controller 200 may calculate the coordinates of a target position to which the pointer should be shifted in correspondence with a movement of the remote controller 200 and output the calculated coordinates to the user input interface 140. In this case, the user input interface 140 may transmit information about the received pointer coordinates to the controller 170 without correcting handshakes or errors.

The storage 150 may store a video signal and audio and data signals related to the video signal, input to the image display apparatus 100. For example, a video record command may be input to the image display apparatus 100 during playing back a video based on a broadcast signal. The storage 150 may store at least part of the played-back video according to the video record command. When the image display apparatus 100 receives a video playback command, it may refer to a video signal and audio and data signals related to the video signal which are stored in the storage 150 and play back a video based on the referred signals.

The controller 170 provides overall control to the image display apparatus 100. The controller 170 may receive a signal from the remote controller 200 or from other control command input devices. The controller 170 may also receive a command through a local key of the image display apparatus 100. Thus the controller 170 may identify a command included in the received signal or the command corresponding to the manipulated local key and control the image display apparatus 100 according to the command.

For example, upon receipt of a command to select a specific channel from the user, the controller 170 controls the broadcast signal receiver 110 to receive a broadcast signal of the selected channel. The controller 170 may also process a video or audio signal of the selected channel and output the processed video or audio signal to the display 180 or the audio output portion 185.

The controller 170 may process a video or audio signal based on information included in a data signal received along with the video or audio signal. For example, the controller 170 may identify the format of the video signal using the data signal and process the video signal according to the format.

The controller 170 may generate an On Screen Data (OSD) signal by which to display an OSD message related to an image based on a video signal, using a data signal related to the video signal. In addition, the controller 170 may generate a Graphical User Interface (GUI) through which the user can identify information related to the image display apparatus 100 or enter a control command to the image display apparatus 100.

The user may enter another type of video or audio output command through the remote controller 200 or any other control command input device. For example, when the user wants to view an image captured by a camera or a camcorder received from the external device I/O portion 130, instead of a broadcast program, the controller 170 may control a video or audio signal received through, for example, a USB port of the external device I/O portion 130 to be processed such that the video or audio signal is output to the display 180 or the audio output portion 185.

In accordance with the exemplary embodiment of the present invention, the controller 170 may process an external two-dimensional (2D) or 3D video signal to be displayed on the display 180. Further, the controller 170 may process a video signal in such a manner that a created GUI is displayed in 3D on the display 180. The controller 170 will be described later in great detail with reference to FIG. 3.

The display 180 may generate driving signals by changing a processed video signal, a processed data signal, and an OSD signal received from the controller 170 or a video signal and a data signal received from the external device I/O portion 130.

The display 180 may display a screen according to a generated driving signal. The display 180 may be implemented into various types of displays such as a Plasma Display Panel (PDP), a Liquid Crystal Display (LCD), an Organic Light Emitting Diode (OLED), and a flexible display. According to the exemplary embodiment of the present invention, the image display apparatus 100 and the display 180 are capable of displaying 3D images.

For 3D visualization, the display 180 may be configured into an auto-stereoscopic 3D display (glasses-free) or a traditional stereoscopic 3D display (with glasses).

Auto-stereoscopy is any method of displaying 3D images without any additional display, for example, special polarization glasses on the part of a user. Thus, the display 180 displays 3D images on its own. Lenticular and parallax barrier are examples of auto-stereoscopic 3D imaging.

The traditional stereoscopy requires an additional display besides the display 180 in order to display 3D images. The additional display may be a Head Mount Display (HMD) type, a glasses type, etc. As special 3D glasses, there are polarization glasses, shutter glasses, and a spectrum filter.

The display 180 may also be implemented as a touch screen so that it is used not only as an output device but also as an input device.

The audio output portion 185 may receive a processed audio signal (e.g. a stereo signal, a 3.1-channel signal or a 5.1-channel signal) from the controller 170 and output the received audio signal as voice. The audio output portion 185 may be implemented into various types of speakers.

Figure 3:
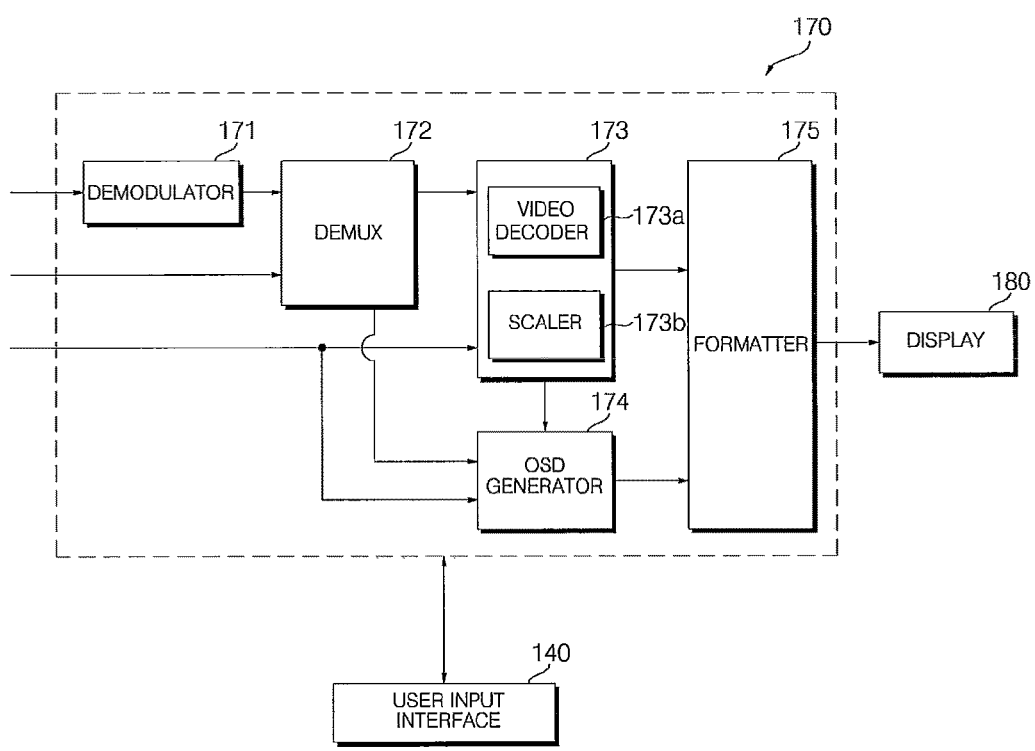
FIG. 3 is a block diagram of a controller illustrated in FIG. 1.

FIG. 3 is a block diagram of the controller 170 in the image display apparatus 100 according to an exemplary embodiment of the present invention.

Referring to FIG. 3, the controller 170 may include a demodulator 171, a Demultiplexer (DEMUX) 172, a decoder 173, an OSD generator 174, and a formatter 175.

The demodulator 171 may demodulate a broadcast signal received from the broadcast signal receiver 110. For example, the demodulator 171 may receive a digital IF signal DIF from the broadcast signal receiver 110 and demodulate the digital IF signal DIF. The demodulator 171 may also perform channel decoding. For the channel decoding, the demodulator 171 may include a convolutional decoder (not shown), a deinterleaver (not shown) and a Reed-Solomon decoder (not shown) and perform convolutional decoding, de-interleaving and Reed-Solomon decoding.

The demodulator 171 may perform demodulation and channel decoding on the digital IF signal received from the broadcast signal receiver 110, thereby obtaining a stream signal TS. The stream signal TS may be a signal in which a video signal, an audio signal and/or a data signal are multiplexed. For example, the stream signal TS may be an Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

In order to properly handle not only ATSC signals but also DVB signals, the demodulator 171 may include an ATSC demodulator and a DVB demodulator. The demodulator 171 may output the stream signal TS to the demultiplexer 172.

The DEMUX 172 may demultiplex the input stream signal TS, for example, an MPEG-2 TS into an audio signal, a video signal, and a data signal. The DEMUX 172 may receive the stream signal from the demodulator 171, the network interface 120, or the external device I/O portion 130.

The data signal obtained by demultiplexing the input stream signal may be a coded data signal. The coded data signal may include Electronic Program Guide (EPG) information that provides broadcasting information such as the titles and start and end times of broadcast programs played on each broadcast channel. For instance, the EPG information may be ATSC-Program and System Information Protocol (TSC-PSIP) information in case of ATSC, whereas it may be DVB-Service Information (DVB-SI) in case of DVB.

The decoder 173 may decode the demultiplexed signals. In this exemplary embodiment, the decoder 173 may include a video decoder 173a for decoding the demultiplexed video signal, and a scaler 173b for controlling the resolution of the decoded video signal to a resolution level at which the decoded video signal can be output in the image display apparatus 100.

The OSD generator 174 may generate an OSD signal to display an object in OSD on the display 180. The OSD may represent information related to an image displayed on the display 180. The OSD may also include a User Interface (UI) through which a control signal for controlling an operation of the image display apparatus 100 or a user command is received.

The OSD generator 174 may extract thumbnail images corresponding to a playback time of contents that are being played back or can be played back in the image display apparatus 100 in the exemplary embodiment of the present invention. The OSD generator 174 may generate an OSD signal such that a 3D object including an extracted thumbnail image can be perceived to the user and outputs the OSD signal to the formatter 175.

The formatter 175 may identify the format of the input video signal referring to a data signal related to the video signal. The formatter 175 may convert the video signal to a format suitable for the display 180 and output the converted video signal to the display 180.

In this exemplary embodiment, the image display apparatus 100 may display a 3D image on the display 180. The formatter 175 may create a 3D video signal in a format suitable for displaying the 3D image on the display 180. The 3D image may include a left-eye image and/or a right-eye image. As described before, a left-eye image and a right-eye image may be used to create a 3D image in the exemplary embodiment of the present invention. Left-eye and right-eye image signals may be video signals for displaying the left-eye and right-eye images, respectively. The formatter 175 outputs the 3D video signal to the display 180, and the display 180 displays a 3D image based on the 3D video signal.

In this exemplary embodiment, the image display apparatus 100 may display an OSD as a 3D object according to an OSD signal generated from the OSD generator 174. The formatter 175 may convert the OSD signal to a 3D signal in a format suitable for displaying the 3D signal on the display 180, so that multi-viewpoint images of a 3D object, that is, the left-eye and right-eye images of the 3D object can be displayed on the display 180 and output the 3D signal to the display 180.

The image display apparatus 100, which is provided with a UI generator, may further include a mixer for mixing a video signal received from the decoder 183 and the OSD generator 174 with a UI video signal received from the UI generator. The mixer may reside within the formatter 175, for mixing the video signals received from the decoder 173 and the OSD generator 174.

FIGS. 4A to 4E illustrate 3D formats available for 3D visualization. The 3D image formats are classified according to layouts of left-eye and right-eye images generated to form a 3D image.

A 3D image may be formed with multi-viewpoint images. The user may view the multi-viewpoint images with his or her left and right eyes. The disparity between the multi-viewpoint images viewed by the left and right eyes gives the illusion of 3D to the user. The multi-viewpoint images that form the 3D image are a left-eye image perceivable to the left eye and a right-eye image perceivable to the right eye in accordance with an exemplary embodiment of the present invention.

Figure 4:
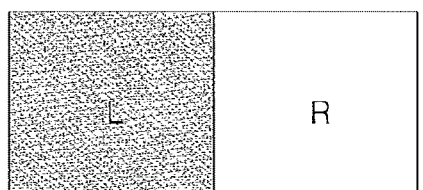
FIGS. 4A to 4E illustrate 3D formats available for 3D visualization.
Figure 4:
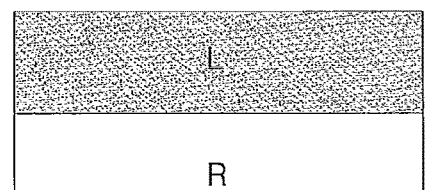
Figure 4:
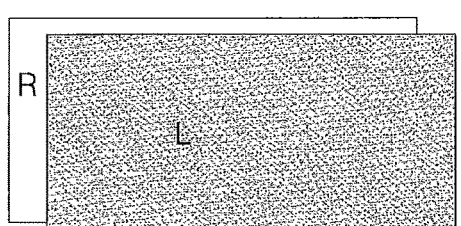
Figure 4:
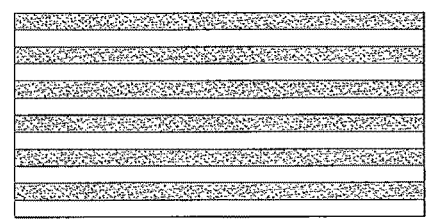
Figure 4:
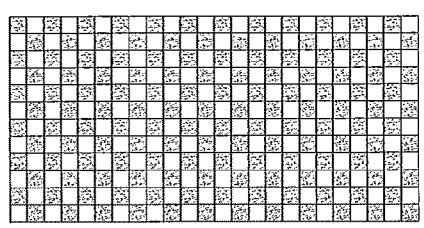

Referring to FIG. 4A, the left-eye and right-eye images are disposed on the left and right sides, respectively. This is called a side by side format. Referring to FIG. 4B, the left-eye and right-eye images are arranged vertically in a top-down format. Referring to FIG. 4C, a time-division layout of the left-eye and right-eye images is called a frame sequential format. Referring to FIG. 4D, the left-eye and right-eye images alternate with each other line by line. This is called an interlaced format. Referring to FIG. 4E, the left-eye and right-eye images are mixed in the form of boxes in a checker box format.

A video signal included in a signal received from an external device and a GUI video signal created to represent information related to the image display apparatus 100 or enter a command to the image display apparatus 100 may be 3D video signals with which 3D images are realized. The formatter 175 mixes these 3D video signals and outputs the mixed 3D video signal to the display 180.

The formatter 175 may identify the format of the mixed 3D video signal referring to a related data signal. The formatter 175 may process the 3D video signal according to the identified format and output the processed 3D video signal to the display 180. If limited 3D image formats are available to the display 180, the formatter 175 may convert the received 3D video signal to a 3D image format in which the display 180 can display a 3D image and output the converted 3D video signal to the display 180.

The OSD generator 174 may generate an OSD signal. Specifically, the OSD generator 174 may generate a signal for displaying information graphically or as text on the screen of the display 180 based on at least one of a video signal and a data signal or a user input signal received from the remote controller 200 or any other control command input device. The OSD generator 174 may also generate a signal for displaying graphics or text by which the user can enter a control command to the image display apparatus 100. The OSD signal may be output to the display 180, along with processed video and data signals. The OSD signal, which is a signal generated for displaying graphics or text, may include information about a UI screen, a menu screen, a widget, an icon, etc. that can be displayed on the display 180. The OSD generator 174 may generate an OSD signal in 2D or 3D. The OSD signal generated from the OSD generator 174 may include a 3D GUI video signal which is to be mixed with another video signal in the formatter 175.

The display 180 may display an object according to the OSD signal received from the OSD generator 174. In the exemplary embodiment of the present invention, the object may be one of a volume control button, a channel control button, an image display apparatus control menu, an icon, a navigation tab, a scroll bar, a progressive bar, a text box, and a window.

The user can identify information about the image display apparatus 100 or information about an image displayed in the image display apparatus 100, from the object displayed on the display 180. Additionally, the user can enter a command to the image display apparatus 100 using the object displayed on the display 180. A 3D object is a stereoscopically rendered object, herein. The 3D object may be a Picture-In-Picture (PIP) image, an EPG that provides information about broadcast programs, a menu of the image display apparatus 100, a widget, an icon, etc.

Figure 5:
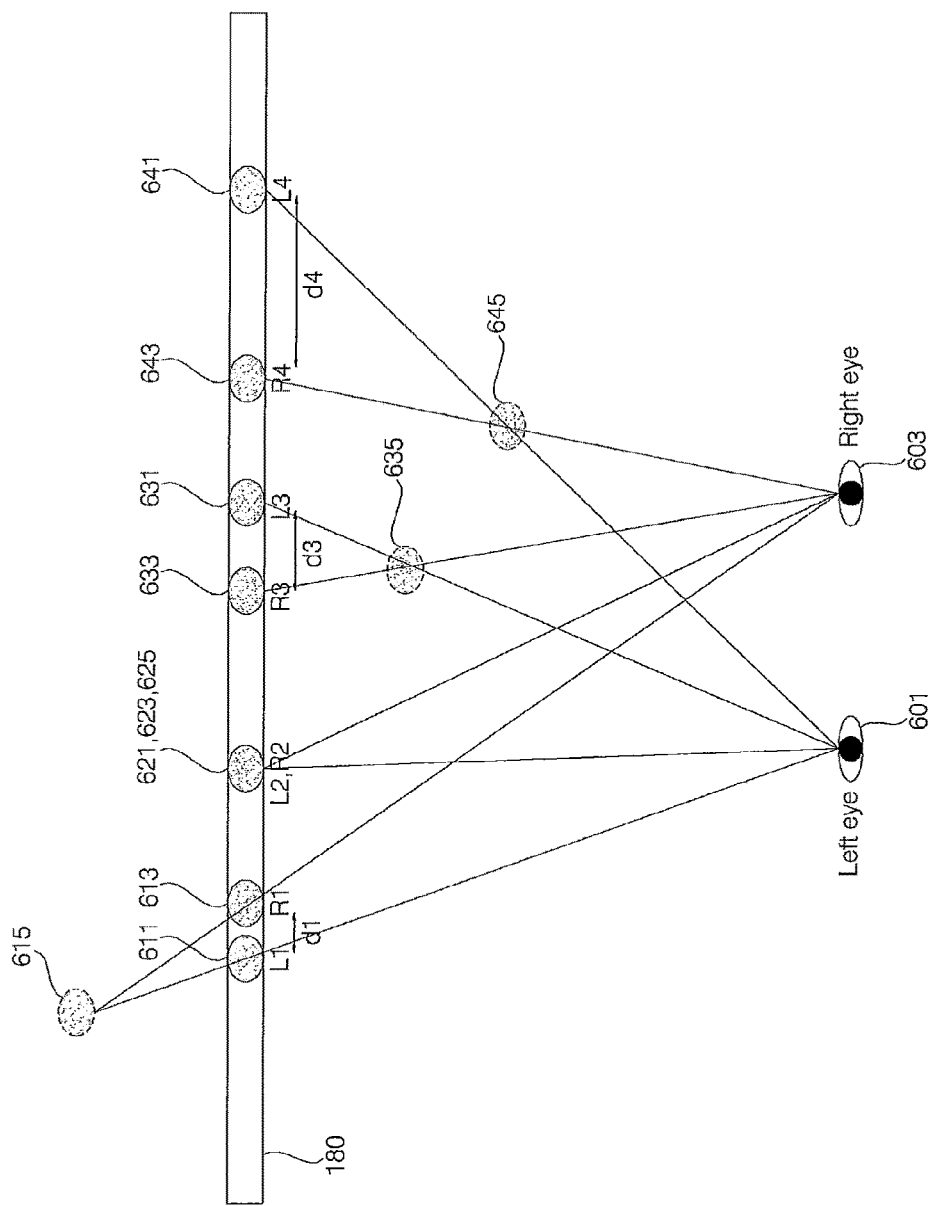
FIG. 5 illustrates different illusions of depth created for 3D images or 3D objects.

FIG. 5 illustrates different depth illusions of 3D images or 3D objects according to an exemplary embodiment of the present invention.

As described before, a 3D image is formed with multi-viewpoint images in the exemplary embodiment of the present invention. The multi-viewpoint images may be the left-eye and right-eye images of the 3D image. Images are formed at different positions on the part of a user, according to the disparities between the left-eye and right-eye images of the images, as illustrated in FIG. 5. With reference to FIG. 5, a sense of 3D or a sense of perspective that the user feels about an image according to the disparity between the left-eye and right-eye images of the image will be described below.

Referring to FIG. 5, there are first to fourth images or objects 615, 625, 635 and 645 rendered with different senses of depth.

The first object 615 is composed of a first left-eye image based on a first left-eye image signal and a first right-eye image based on a first right-eye image signal. That is, a video signal for displaying the first object 615 is created using the first left-eye and right-eye image signals. In FIG. 5, the positions of the first left-eye image based on the first left-eye image signal and the first right-eye image based on the first right-eye image signal, and the disparity between the first left-eye and right-eye images are shown. The same description applies to the second, third and fourth objects 625, 635 and 645. For the convenience' sake of description, reference numerals or characters that denote left-eye and right-eye images displayed on the display 180 to create an object, the disparity between the two images, and the object will be uniformly given.

The first object 615 is created by combining a first left-eye image 611 (L1) with a first right-eye image 613 (R1), with a disparity d1 between the first left-eye and right-eye images 611 and 613. The user sees an image as formed at the intersection between a line connecting a left eye 601 to the first left-eye image 611 and a line connecting a right eye 603 to the first right-eye image 613. Therefore, the user is tricked into perceiving the first object 615 as behind the display 180. The distance between the display 180 and the first object 615 is represented as a depth. When a 3D object is perceived to the user as being positioned behind the display 180, the depth of the 3D object is negative-signed. Therefore, the depth of the first object 615 is a negative value.

The second object 625 is created with a second left-eye image 621 (L2) and a second right-eye image 623 (R2) on the display 180. Since the second left-eye and right-eye images 621 and 623 are at the same position on the display, the disparity between the second left-eye and right-eye images 621 and 623 is 0. The user sees an image as formed at the intersection between a line connecting the left eye 601 to the second left-eye image 621 and a line connecting the right eye 603 to the second right-eye image 623. Therefore, the user perceives the second object 625 as positioned on the display 180. In this case, it can be said that the second object 625 is a 2D object. The second object 625 has the same depth as the display 180, that is, a depth of 0.

The third and fourth objects 635 and 645 are examples of 3D objects perceived as protruding toward the user. It may be noted from the third and fourth objects 635 and 645 that the user feels different senses of perspective or different senses of 3D according to different disparities between left-eye and right-eye images.

The third object 635 is created by combining a third left-eye image 631 (L3) with a third right-eye image 633 (R3), with a disparity d3 between the third left-eye and right-eye images 631 and 633. The user sees an image as formed at the intersection between a line connecting the left eye 601 to the third left-eye image 631 and a line connecting the right eye 603 to the third right-eye image 633. Therefore, the user is tricked into perceiving the third object 635 as positioned before the display 180, that is, toward the user. In other words, the user perceives the third object 635 as protruding toward the user from the display 180. Since a 3D object perceived as being positioned before the display 180 has a positive depth value, the depth of the third object 635 is positive-signed.

The fourth object 645 is created by combining a fourth left-eye image 641 (L4) with a fourth right-eye image 643 (R4), with a disparity d4 between the fourth left-eye and right-eye images 641 and 643. d3 and d4 are placed in the relationship of d3<d4. The user sees an image as formed at the intersection between a line connecting the left eye 601 to the fourth left-eye image 641 and a line connecting the right eye 603 to the fourth right-eye image 643. Therefore, the user is tricked into perceiving the fourth object 645 as positioned before the display 180, that is, toward the user, particularly nearer to the user than the third object 635. That is, the user perceives the fourth object 645 as more protruding toward the user from the display 180 than the third object 635. The depth of the fourth object 645 is positive-signed.

The image display apparatus 100 may control the positions of left-eye and right-eye images displayed on the display 180 so that an object created with the left-eye and right-eye images can be perceived to the user as positioned behind or before the display 180. In addition, the image display apparatus 100 may control the depth illusion of the object created with the left-eye and right-eye images by controlling the disparity between the left-eye and right-eye images displayed on the display 180.

It is noted from FIG. 5 that an object formed with a left-eye image and a right-eye image has a positive or negative depth value according to the positions of the left-eye and right-eye images on the display 180. As stated before, an object having a positive depth value is perceived as protruding to the user, whereas an object having a negative depth value is perceived as receding from the user. FIG. 5 also reveals that the depth illusion of an object, that is, the distance between the display 180 and the position at which a 3D image is perceived as being formed is changed according to the absolute value of the disparity between the left-eye and right-eye images of the object.

Figure 6:
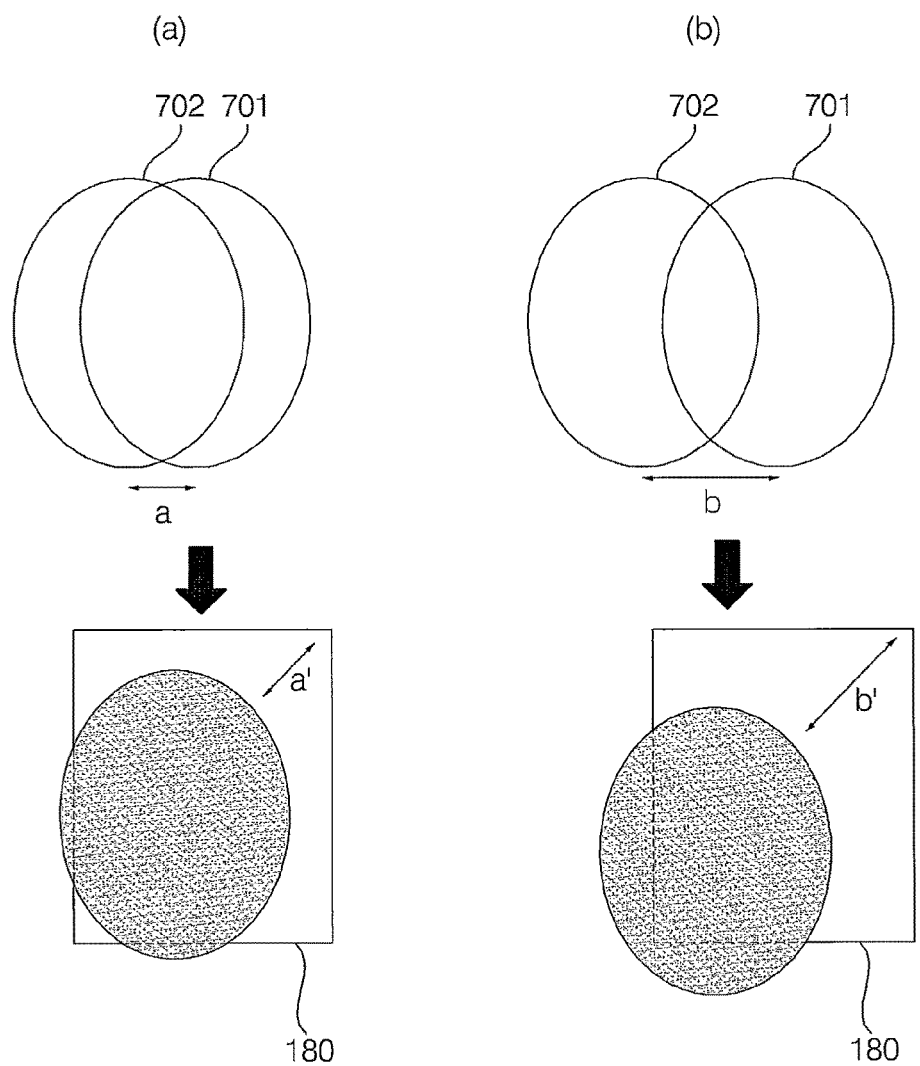
FIGS. 6A and 6B illustrate an operation for controlling the depth illusion of an image according to an exemplary embodiment of the present invention.

FIGS. 6A and 6B illustrate an operation for controlling the depth illusion of an image according to an exemplary embodiment of the present invention.

Referring to FIGS. 6A and 6B, the depth illusion of the same image or 3D object varies with the disparity between left-eye and right-eye images 701 and 702 that form the image or 3D object on the display 180. In this exemplary embodiment, the display 180 has a depth of 0 and the depth of an image perceived as protruding from the display 180 is a positive value.

The disparity a between the left-eye image 701 and the right-eye image 702 in FIG. 6A is smaller than the disparity b between the left-eye image 701 and the right-eye image 702 in FIG. 6B. That is, the left-eye image 701 is farther from the right-eye image 702 in FIG. 6B than in FIG. 6A.

As described before with reference to FIG. 5, a 3D image or 3D object is seen deeper in FIG. 6B than in FIG. 6A. If the depths of two cases are quantified and denoted by a' and b', respectively, the relationship of a'<b' is also established because a<b. That is, the depth of the 3D image gets larger or smaller by widening or narrowing the disparity between the left-eye image 701 and the right-eye image 702.

Figure 7:
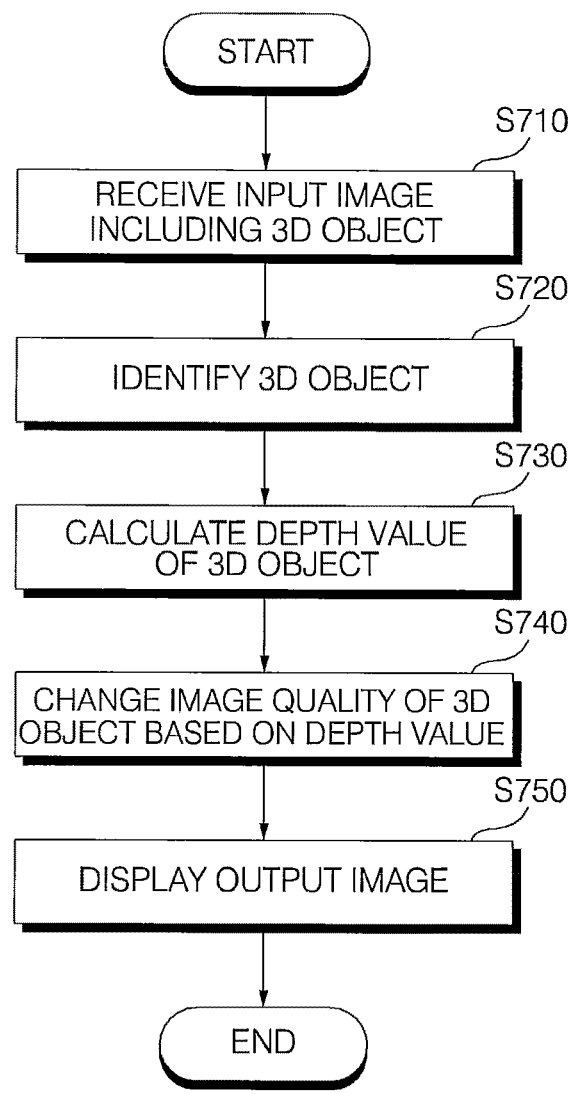
FIG. 7 is a flowchart illustrating a method for operating the image display apparatus according to an exemplary embodiment of the present invention.

FIG. 7 is a flowchart illustrating a method for operating the image display apparatus according to an exemplary embodiment of the present invention.

Referring to FIG. 7, the image display apparatus 100 receives an image in step S710. The image display apparatus 100 may receive a 2D video signal and/or a 3D video signal from various paths through the video signal receiver 105. The received image may include at least one object and the object may be a 2D or 3D one. The object may be formed into a figure like a dot, line, or plane, or any other shape. Herein, the object may be an OSD image. In this case, the object is referred to as an OSD object. Particularly, an OSD object taking the form of a 3D image is referred to as a 3D OSD object. In accordance with the exemplary embodiment of the present invention, the input image includes one or more 3D objects. Accordingly, an image input to the image display apparatus 100 includes a 3D video signal or both 2D and 3D video signals.

When the image display apparatus 100 receives a 3D video signal for 3D object visualization, the display 180 displays at least two multi-viewpoint images that form a 3D image or a 3D object. As the user sees the multi-viewpoint images displayed on the display 180 with his or her left and right eyes, the user is tricked into perceiving the multi-viewpoint images as a 3D image.

In step S720, the controller 170 identifies a 3D object in the input image. The 3D object may be identified and its depth value may be obtained in various methods. Among them, one method is to use a histogram. Specifically, the controller 170 reads video data about left-eye and right-eye images and then finds inflection points in pixel values by a histogram analysis. To find the inflection points, the controller 170 may divide the image into smaller areas like blocks and analyze pixel values on a block basis. The controller 170 may determine blocks with the same pixel values in the left-eye and right-eye images as matching blocks and calculate the shift between the matching blocks. In this manner, the controller 170 may identify the 3D object in the image and calculate its depth value.

Another method is to use RGB values. According to this method, points experiencing rapid color changes are extracted from the image and constructed as data. These points are determined as an edge of a 3D object. This process of detecting color-changed points based on RGB data, determining an edge of a 3D object, and forming data based on the edge may take place in the controller 170, or during image capturing in a device that has generated the image. Even the edge and disparity of the 3D object may be determined by performing an identical analysis on the left-eye and right-eye images of the 3D object.

A 3D object may also be identified by edge analysis and extraction. For the edge analysis, histogram data and RGB data may be used. The controller 170 stores the histogram data of the left-eye and right-eye images and detects similar histogram data between the left-eye and right-eye images. Then the controller 170 compares RGB data having similar histograms. A similar histogram refers to pixels having an RGB value difference of 20 or below. Then the controller 170 compares the histograms of the left-eye and right-eye images in terms of maximum values and minimum values and thus calculates the shift value (i.e. disparity) between the pixels of the left-eye and right-eye images.

In the above manner, a 3D object is identified in step S720 and its depth value is calculated in step S730. The disparity between the left-eye and right-eye images of the 3D object may be used in the calculation of the depth value.

As described before, a 3D object may have a positive or negative depth value, or a depth of zero. If the 3D object appears protruding from the display 180, it has a positive depth value. On the other hand, if the 3D object appears receding from the display 180, it has a negative depth value. As a 3D object is deeper, it appears more protruding toward the user. Especially, as its depth value is larger, a 3D object having a positive depth value has a more enhanced 3D effect for the user.

If the input image is a moving picture, each frame included in the image may include one or more objects. If these objects are 3D objects, depth information about the 3D objects may be transmitted along with a video signal corresponding to the image to the image display apparatus 100. This means that the depth information about the 3D objects included in the 3D image may be carried as metadata in a 3D video signal.

After identifying the 3D object and calculating or acquiring the depth value of the 3D object, the controller 170 may control the sharpness and/or brightness of the pixels of the 3D object in step S740. The controller 170 changes the values of pixels corresponding to a deeper 3D object such that their sharpness and/or brightness is increased. On the other hand, in the case of a less deep 3D object, the controller 170 changes the values of pixels corresponding to the 3D object such that their sharpness and/or brightness is decreased. Because sharpness and/or brightness is controlled along with depth, the user can feel an enhanced 3D effect.

The controller 170 maximizes a sense of perspective among 3D objects by assigning sharpness levels or brightness levels to the 3D objects in correspondence with the depth values of the 3D objects. Therefore, a more protruding 3D object is displayed brighter or clearer and thus appears nearer to the user, whereas a more receding 3D object is displayed less bright or less clear and thus appears farther from the user. Thus, the 3D effect is maximized based on the empirical fact that a nearer object looks brighter and clearer and a farther object looks darker and more obscure in a real space in the exemplary embodiment of the present invention.

The user may select a particular object in the image and enter a depth control signal to change the depth of the selected object. That is, the depth of a 3D object may be controlled and changed by the user. Even in this case, the image quality of the object may be controlled according to its depth in the above-described manner.

Upon receipt of the depth control signal from the user, the controller 170 first identifies the object selected by the user and increases or decreases the depth of the object by controlling the disparity between the left-eye and right-eye images of the object. According to user-set depth information about the object or information about a user-set disparity between the left-eye and right-eye images of the object, the sharpness and/or brightness of the object may be controlled in the same manner as described above. In the case where the controller 170 uses an image quality parameter such as brightness or sharpness, when the user selects a particular depth for the object, the controller 170 controls the brightness or sharpness of the object using a parameter value corresponding to the selected depth.

To be more specific, upon receipt of a depth control signal for a particular 3D object from the user, the controller 170 controls the disparity between the left-eye and right-eye images of the 3D object based on depth information about the 3D object set by the user. Simultaneously with the depth control, the controller 170 controls the brightness or sharpness of pixels corresponding to the 3D object. Alternatively or additionally, the controller 170 may directly output information about the coordinates of the pixels corresponding to the 3D object and the use-set depth information about the 3D object to the display 180.

When determining the image quality of the 3D object such as brightness or sharpness, the controller 170 or the display 180 may refer pre-stored information about mapping between depth values and image quality parameter information or between disparity values and image quality parameter information in the image display apparatus 100.

Also, when a 2D image is displayed changed to a 3D image, a disparity may be preset for the 3D image or a depth control signal may be received from the user. For the 3D image, a brightness value or a sharpness value may also be preset for the depth value or disparity of the 3D image.

Accordingly, the controller 170 may control the brightness or sharpness of a 3D object based on a parameter that has been calculated or pre-stored for the depth value or depth information of the 3D object, irrespective of the manner in which the depth value or depth information of the 3D object was determined.

In step S750, when an output image including the 3D object for which the sharpness and/or brightness has been corrected is generated, the display 180 displays the output image.

Figure 8:
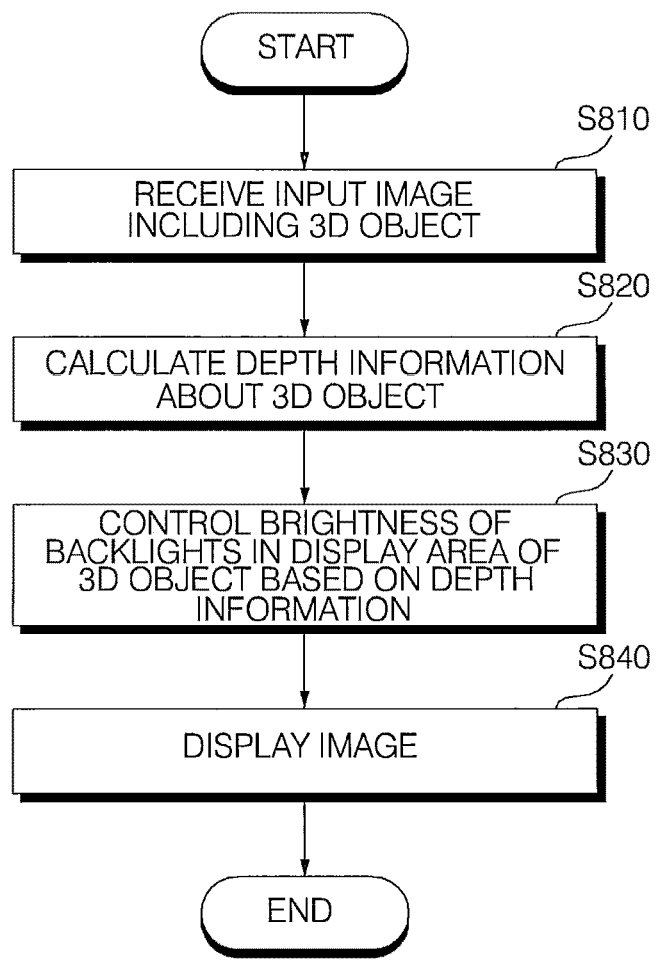
FIG. 8 is a flowchart illustrating a method for operating the image display apparatus according to another exemplary embodiment of the present invention.

FIG. 8 is a flowchart illustrating a method for operating the image display apparatus according to another exemplary embodiment of the present invention.

Referring to FIG. 8, an image including a 3D object is received in step S810. Since the 3D object is included in the received image, a process of identifying the 3D object may be needed. However, if the controller 170 generates the image on its own, that is, if the controller 170 generates a 3D object or a 3D OSD object, the 3D object identification may not be performed. Therefore, a process of calculating the depth value of the 3D object by the controller 170 may also be omitted.

In step S820, the controller 170 calculates depth information about the 3D object. The depth information may be the depth value of the 3D object based on the disparity between the left-eye and right-eye images of the 3D object, or metadata received along with a 3D video signal corresponding to the 3D object. Or the depth information may indicate a depth level corresponding to the depth value. To be more specific, a plurality of depth levels are defined and depth values calculated in various manners are classified into the depth levels. For example, if depth values available to 3D objects fall into the ranges of −10 to below −5, −5 to below 0, 0 to below 5, and 5 to below 10, the ranges may be classified into levels −2, −1, 1 and 2, respectively. Herein, −2, −1, 1 and 2 may be depth information.

The controller 170 may control the brightness of a specific area in which the 3D object will be displayed on the display 180 according to the depth information. For instance, if the display 180 is configured as an LCD having LEDs as backlights, the controller 170 controls the brightness of the display area of the 3D object by controlling the LED backlights of the display area in the display 180. That is, the controller 170 controls the brightness of backlights in the area of the 3D object on the display 180 according to the depth information in step S830.

According to the depth information, the controller 170 controls backlights corresponding to the display area of a 3D object with a larger depth value to illuminate more brightly and controls backlights corresponding to the display area of a 3D object with a smaller depth value to illuminate less brightly. Compared to the exemplary embodiment described in FIG. 7 in which a new output image with corrected pixel values for a 3D object is generated, the exemplary embodiment described in FIG. 8 is characterized in that the controller 170 controls a backlight unit of the display 180.

That is, the controller 170 may control the brightness of the display 180 in correspondence with referred depth information about a 3D object. Herein, the controller 170 may divide the display 180 into a plurality of areas and control the brightness of each area according to the display area of the 3D object. Accordingly, the brightness levels of the areas may be different on the display 180 according to the depth value or depth information of the 3D object. If the controller 170 directly controls the brightness of the display 180, a process of re-processing a 3D video signal corresponding to the 3D object to change the brightness of the 3D object may not be performed.

When the depth of a 3D object is controlled by a user-input depth control signal, the brightness of the display 180 may be controlled according to the depth of the 3D object in the same manner. More specifically, the user may select a particular 3D object in the image and enter a depth control signal to change the depth of the 3D object. The controller 170 may identify the user-selected object and control the brightness of an area in which the 3D object will be displayed according to a changed disparity between the left-eye and right-eye images of the 3D object, simultaneously with controlling the depth of the 3D object by changing the disparity.

That is, the controller 170 may control the brightness of the display 180 according to the position of the user-selected 3D object on the display 180 and use-set depth information about the 3D object. Or the controller 170 may directly output to the display 180 a depth value or depth information indicating the user-set depth for the 3D object and information about the coordinates of an area of which the brightness is to be controlled on the display 180.

The brightness of the area of the 3D object may be determined according to the user-set depth for the 3D object, referring to preset information about mapping between depth values and parameter information or between disparities and parameter information.

Besides, even when a 2D image is displayed changed to a 3D image, a disparity may be preset for the 3D image or a depth control signal may be received from the user. In addition, a brightness level may be preset for the display 180 according to the depth value or disparity of the 3D object. Therefore, the display 180 may display the 3D image based on a parameter value that has been calculated or pre-stored according to the depth value or depth information of the 3D object, irrespective of the manner in which the depth value or depth information of the 3D object was determined.

The display 180 displays an input image, a stored image, or an output image corrected by the controller 170 and at the same time, the backlights are illuminated according to a brightness level controlled by the controller 170.

FIG. 9 illustrates an image quality parameter table for use in operating the image display apparatus according to an exemplary embodiment of the present invention.

The controller 170 may use preset parameters in controlling the image quality of an image, such as brightness and/or sharpness, according to the depth value or depth information of the image. In this case, information about image quality parameters versus depth information that an object included in a video frame of an input video signal may have is stored in the storage 150 of the image display apparatus 100 according to this exemplary embodiment. Thus the controller 170 may refer to an image quality parameter value corresponding to the depth of a 3D object perceivable to the user through the image display apparatus 100 in the storage 150. The controller 170 may process a video signal to be output to the display 180 such that the 3D object is displayed according to the image quality parameter value. The formatter 175 of the controller 170 may be responsible for controlling the image quality of each 3D object according to an image quality parameter.

The controller 170 calculates or acquires the depth value or depth information of a 3D object to be adjusted in image quality in any of various available methods, as described before. Then the controller 170 may find an image quality parameter corresponding to the depth value or depth information of the 3D object.

The depth value or depth information of a 3D object may be acquired as follows.

i) The depth value or depth information of a 3D object may be calculated based on the disparity between the left-eye and right-eye images of the 3D object. The controller 170 carries out the calculation of the depth value or depth information of the 3D object based on the disparity between the left-eye and right-eye images of the 3D object, as described before.

ii) Information about the depth value of each 3D object may be received as metadata along with a video signal in the image display apparatus 100.

iii) If the user controls the depth of a 3D object, a user-input depth control signal for controlling the depth of the 3D object includes information indicating a user-intended depth for the 3D object. Thus, the controller 170 may determine an image quality value such as brightness or sharpness for the 3D object, using the depth value or depth information included in the user-input depth control signal and image quality parameters preset for depth values.

iv) When a 2D image is displayed changed to a 3D image or the controller 170 generates and displays a 3D image, the controller 170 may not perform the process of calculating or receiving depth information about the changed or generated 3D image.

Once the depth value or depth information of a 3D object is calculated in the above-described operation, the image quality of the 3D object, such as brightness or sharpness, is determined according to an image quality parameter value corresponding to the depth value or depth information. Although the depth value or depth information of the 3D object can be calculated in many methods, depth values, depth information, disparities, and/or shift values need to be expressed as values of a predetermined type of information, for example, as depth values and further the values of a predetermined type of information need to be represented in a unified unit of measure in order to uniformly apply depth values or depth information to the image quality parameter table.

In this exemplary embodiment, at least one of brightness, sharpness, color and contrast may be stored as an image quality parameter in the image display apparatus 100. Image quality parameter values may serve as correction values with which to correct pixel values of a 3D object according to depth information about the 3D object or as values for controlling the image quality of each area of the display 180 in displaying a 3D image including a 3D object. Therefore, the controller 170 may correct the values of pixels corresponding to a 3D object and output a video signal corresponding to a corrected output image, or may output an image parameter value along with a video signal to the display 180.

The display 180 may display the corrected output image, or may display a 3D image corresponding to the received 3D video signal according to the image quality parameter value referred to in the storage 150. Hence, the display 180 may display 3D objects having different depth values included in a frame of the same image according to different image quality values.

Referring to the image parameter table illustrated in FIG. 9, z denotes the distance of a 3D object. For example, a 3D object with z=1 is perceived as protruding as much as level 1 from the plane of the display 180 that displays a plurality of multi-viewpoint images forming the 3D object. The user is tricked into perceiving a 3D object with z=300 as protruding as much as level 300 from the plane of the display 180 that displays a plurality of multi-viewpoint images forming the 3D object. The 3D object with z=300 is perceived as nearer to the user than the 3D object with z=1.

Therefore, the image display apparatus 100 sets image quality parameter values for 3D objects so that a 3D object with a larger z value is displayed clearer than a 3D object with a smaller z value. That is, the 3D object perceived as nearer to the user may be colored more heavily than the 3D object perceived as remote from the user. The 3D object perceived as nearer to the user may be brighter than the 3D object perceived as remote from the user. In addition, the 3D object perceived as nearer to the user may be clearer than the 3D object perceived as remote from the user.

A 3D object with the smallest depth value in an image is perceived as remotest from the user. According to the image parameter table of FIG. 9, hence, the 3D object with the smallest depth value is colored most lightly, darkest, or least clear than the other 3D objects in the image. On the contrary, a 3D object with the largest depth value is perceived as nearest to the user. Therefore, the deepest 3D object may be colored most heavily, brightest, or clearest than the other 3D objects in the image according to the image quality parameter table of FIG. 9.

Figure 10:
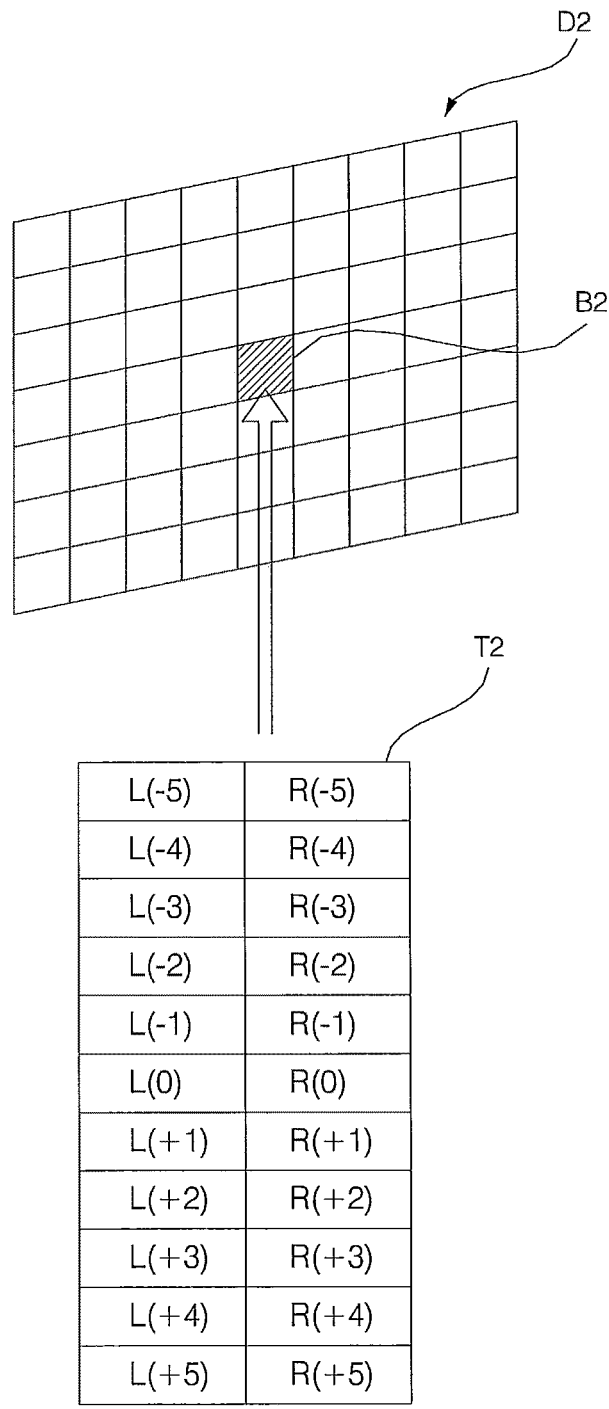
FIG. 10 illustrates an image information table for each block for use in operating the image display apparatus according to an exemplary embodiment of the present invention.

FIG. 10 illustrates a table listing image information on a block basis for use in operating the image display apparatus according to an exemplary embodiment of the present invention The controller 170 may control the display 180, referring to image information on a position basis and on an area basis. According to the exemplary embodiment of the present invention, the controller 170 may divide the display 180 into a plurality of areas and control an image or a 3D object on an area basis. Hereinbelow, it is assumed that the plane of the display 180 is a reference plane D2 and the controller 170 controls the display 180 by dividing the reference plane D2 into a plurality of blocks.

Referring to FIG. 10, the reference plane D2 is divided into a lattice of blocks, by way of example. The controller 170 may use an image information table T2 that lists image information for each block B2. Image information about a block may specify depth values or depth information, sharpness, brightness, etc. available to the block. While the image information table T2 illustrated in FIG. 10 specifies only depth information available to the left-eye and right-eye images of a 3D object in a block described by the image information table T2, the image information table T2 may further specify sharpness information, brightness information, etc. according to the depth values for the block.

In this exemplary embodiment, 11 levels of depth may be defined for a 3D object and a pointer. Level −5 to level −1 are depth information for a 3D object that is displayed appearing behind the plane D2 of the display 180. Level 0 is depth information for a 3D object perceived as positioned on the plane D2 of the display 180. Level +1 to level +5 are depth information for a 3D object that is displayed appearing before the plane D2 of the display 180.

The controller 170 may control the sharpness and/or brightness of a 3D object on a block basis, referring to depth values listed in the image information table T2. The display 180 may also display a 3D object, referring to depth values, depth information, sharpness information, and brightness information listed on a block basis in the image information table T2.

Figure 11:
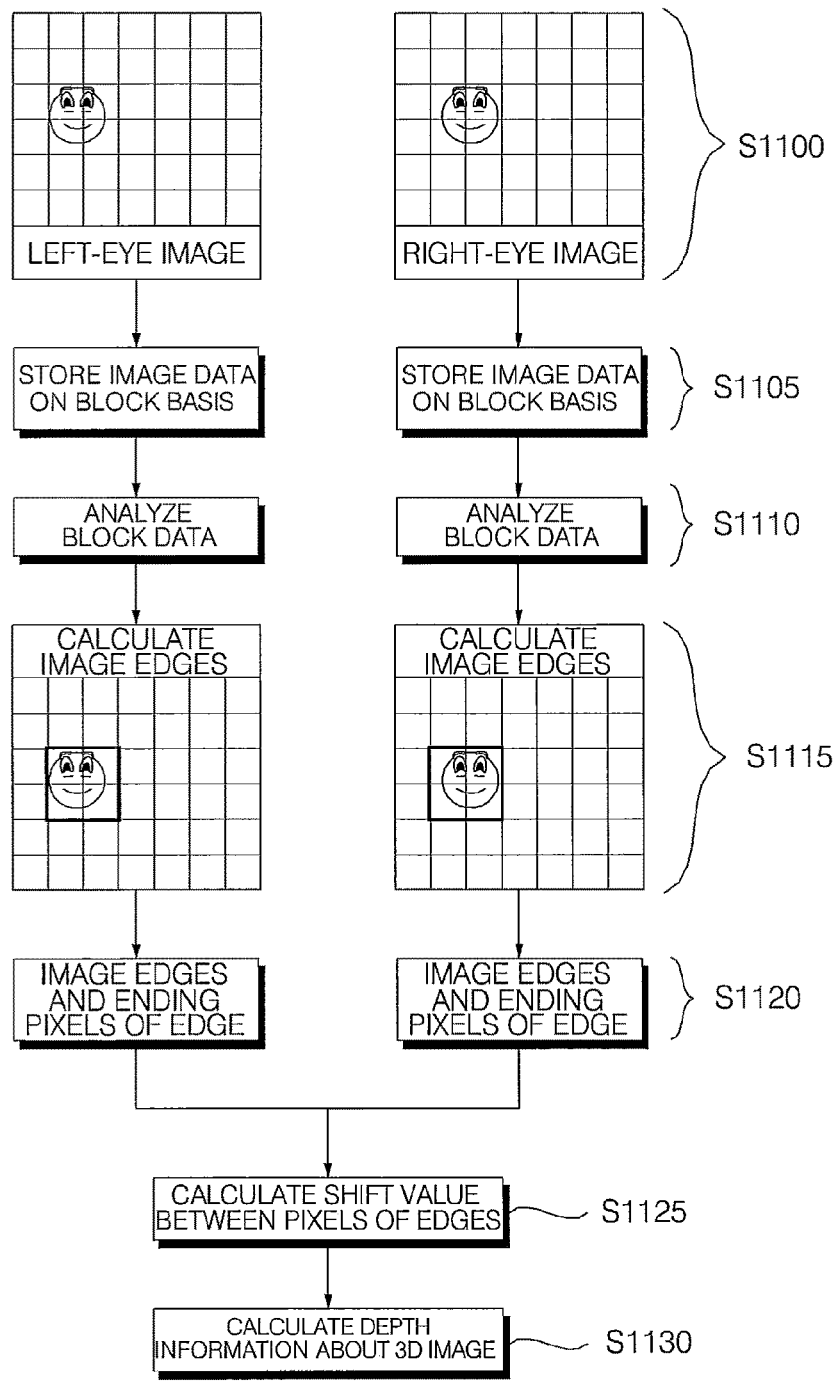
FIGS. 11 and 12 are views referred to for describing an operation for calculating depth information during an operation of the image display apparatus according to an exemplary embodiment of the present invention.
Figures 12, 13:
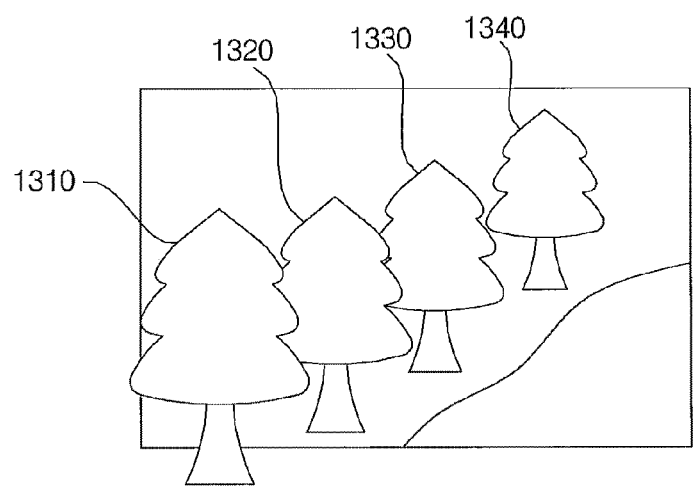
FIGS. 13, 14 and 15 illustrate 3D objects displayed with an enhanced sense of perspective in the image display apparatus according to an exemplary embodiment of the present invention.

FIGS. 11 and 12 are views referred to for describing an operation for calculating depth information during an operation of the image display apparatus according to an exemplary embodiment of the present invention.

The controller 170 may calculate or acquire a depth value or depth information about a 3D object based on the disparity between a plurality of multi-viewpoint images generated from the formatter 175 to create the 3D object, that is, based on information about the distance between positions at which the multi-viewpoint images are displayed on the display 180. The controller 170 may also determine sharpness and/or brightness for the 3D object according to the calculated or acquired depth value or depth information of the 3D object. An operation for identifying a 3D object in an image and calculating the depth value or depth information of the 3D object will be described below in detail.

Referring to FIG. 11, left-eye and right-eye images that will form a 3D object are displayed on the display 180 in step S1100. The controller 170 reads video data of the left-eye and right-eye images on a block basis in step S1105. The video data may be stored. Then the controller 170 analyzes the video data in step S1110. In this exemplary embodiment, the controller 170 calculates an edge of an image displayed in a particular block in step S1115 and detects the starting and ending pixels of the edge in step S1120.

The controller 170 calculates the difference (i.e. shift value) between the starting pixels of the edges detected from the left-eye and right-eye images and the difference (i.e. shift value) between the ending pixels of the edges detected from the left-eye and right-eye images in step S1125. That is, the controller 170 identifies the shape of 3D objects in the left-eye and right-eye images and calculates the shift value between the 3D objects in the left-eye and right-eye images. Hence, the controller 170 may calculate the disparity between the left-eye and right-eye images using the edge shift values and thus calculate the depth value of the 3D object using the disparity.

In step S1130, the controller 170 calculates depth information about the current 3D object, more particularly the 3D object whose edge was detected based on the calculated shift values.

FIG. 12 illustrates a table listing depth information about 3D objects versus shift values. The controller 170 may calculate depth information about the 3D object according to the shift values between the starting and ending pixels of the edges and the direction of the shift, referring to the table.

Figure 14:
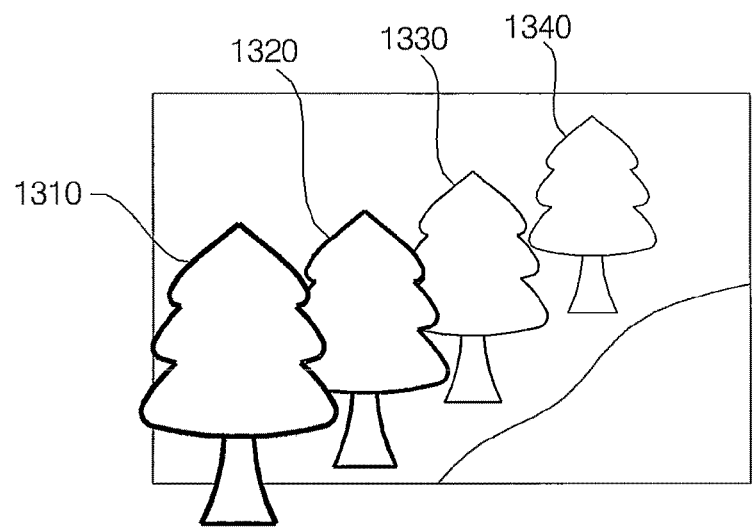
Figure 15:
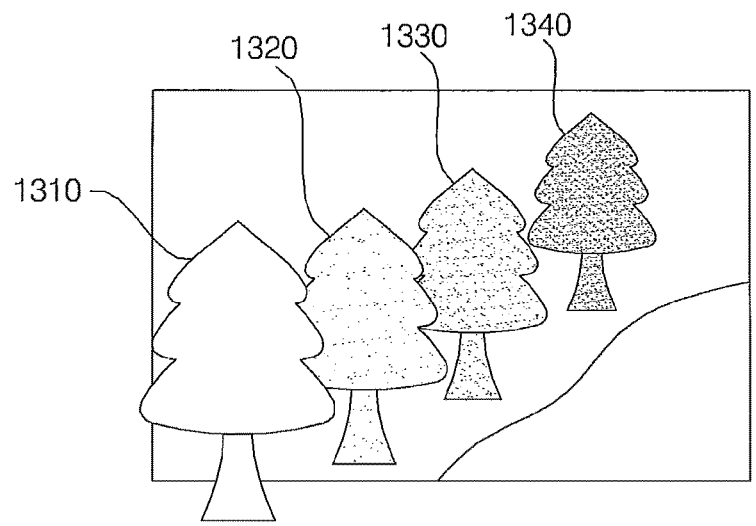

FIGS. 13, 14 and 15 illustrate 3D objects displayed with an enhanced sense of perspective in the image display apparatus according to an exemplary embodiment of the present invention.

FIG. 13 illustrates 3D objects conventionally rendered to give a sense of perspective to the user only using the depths of the 3D objects.

Referring to FIG. 13, an image displayed on the display 180 includes first to fourth 3D objects 1310 to 1340. The first 3D object 1310 has a largest depth value and the depth value decreases in the order of the second, third and fourth objects 1320, 1330 and 1340. Thus the user perceives the first object 1310 as nearest to the user, and the fourth 3D object 1340 as remotest from the user.

FIG. 14 illustrates an image that is rendered to give an enhanced sense of perspective by applying different sharpness values as well as different disparities to 3D objects. Referring to FIG. 14, the controller 170 sets a highest sharpness value for the first 3D object 1310 according to the highest depth value of the first 3D object 1310, decreases the sharpness value differently for the second and third 3D objects 1320 and 1330, and sets a lowest sharpness value for the fourth 3D object 1340, to thereby control the sharpness of the 3D objects 1310 to 1340 according to their different depth values. Therefore, the display 180 displays the first 3D object 1310 sensed as the nearest one, most clearly, while it displays the fourth 3D object 1340 sensed as the remotest one, most obscurely. The user feels the fourth 3D object 1340 as farther than he might feel only with the depth illusion of the fourth 3D object 1340, due to the empirical fact that a remote object is seen obscure.

FIG. 15 illustrates an image rendered to give an enhanced sense of perspective to the user by assigning different brightness values as well as different disparities to 3D objects.

Referring to FIG. 15, the controller 170 sets a highest brightness value for the first 3D object 1310 according to the highest depth value of the first 3D object 1310, decreases the brightness value differently for the second and third 3D objects 1320 and 1330, and sets a lowest brightness value for the fourth 3D object 1340, to thereby correct the values of pixels corresponding to the 3D objects 1310 to 1340. Therefore, the brightness of 3D objects 1310 to 1340 is controlled according to their different depth values.

Consequently, the display 180 displays the first 3D object 1310 sensed as the nearest one, most brightly, while it displays the fourth 3D object 1340 sensed as the remotest one to be darkest. As 3D objects with different depth values are differentiated in brightness in this manner, the image display apparatus 100 may exert an illusion effect so that the user feels the first 3D object 1310 as nearer and the fourth 3D object 1340 as farther.

In accordance with the exemplary embodiment of the present invention, the image display apparatus 100 can maximize a relative sense of perspective among 3D objects with different depth values by differentiating their sharpness and/or brightness. Also, the image display apparatus 100 can dynamically represent a sense of perspective which is difficult to realize only with disparity.

Figure 16:
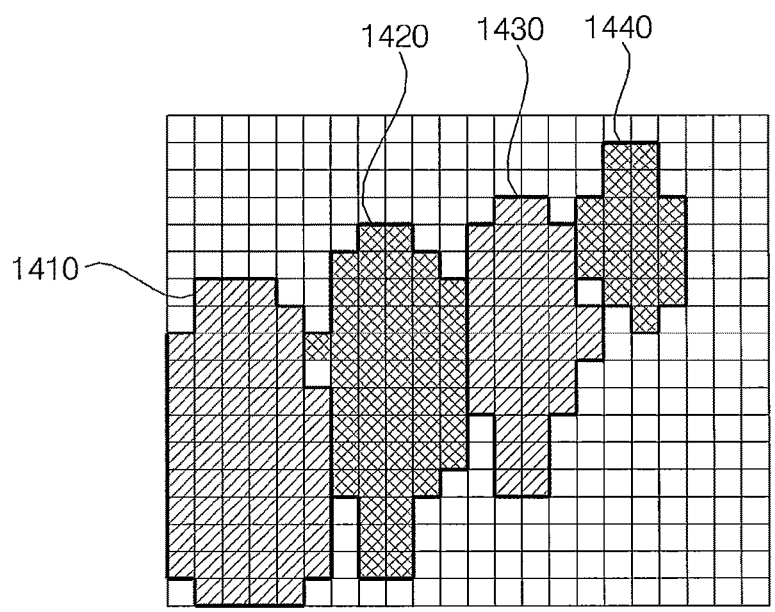
FIG. 16 illustrates an operation for controlling the brightness of backlights in the image display apparatus according to an exemplary embodiment of the present invention.

FIG. 16 illustrates an operation for controlling the brightness of backlights in the image display apparatus according to an exemplary embodiment of the present invention.

As stated before, the controller 170 may divide an image into blocks and may read or control image information about each block. The display 180 may also divide an image into blocks and control the image in image quality such as brightness on a block basis. The following description is made with the appreciation that the display 180 is divided into a lattice of blocks and the brightness of backlights in each block is controlled, by way of example.

Display areas of the first to fourth 3D objects 1310 to 1340 on the display 180 will be referred to as first to fourth areas 1410 to 1440, respectively.

To enhance a sense of perspective that can be realized from 3D objects by controlling the brightness of backlights, the controller 170 may differentiate the first to fourth areas 1410 to 1440 in backlight brightness. Specifically, the controller 170 acquires depth information about each of the 3D objects 1310 to 1340 and then controls the backlights of the first area 1410 to illuminate most brightly in order to render the first 3D object 1310 brightest. The controller 170 also controls the backlights of the second and third areas 1420 and 1430 to illuminate less bright in such a manner that the backlights of the second area 1420 are brighter than those of the third area 1430. The controller 170 controls the backlights of the fourth area 1440 to illuminate least brightly.

Accordingly, the user feels an enhanced sense of perspective from the 3D objects due to their different brightness levels, compared to a sense of perspective that can be felt from the 3D objects only with their different disparities. In addition, the controller 170 may enhance a sense of perspective by controlling the brightness of backlights, without correcting pixel values.

Figure 17:
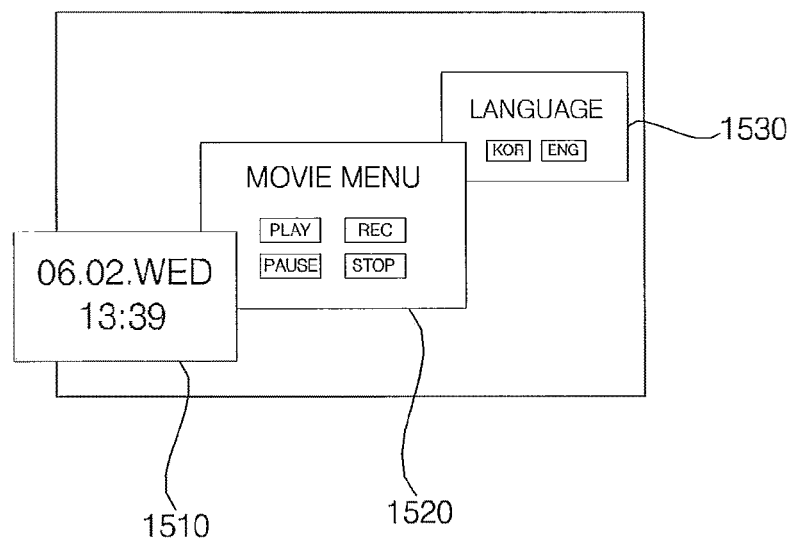
FIGS. 17 and 18 illustrate 3D OSD objects displayed with an enhanced sense of perspective in the image display apparatus according to an exemplary embodiment of the present invention.
Figure 18:
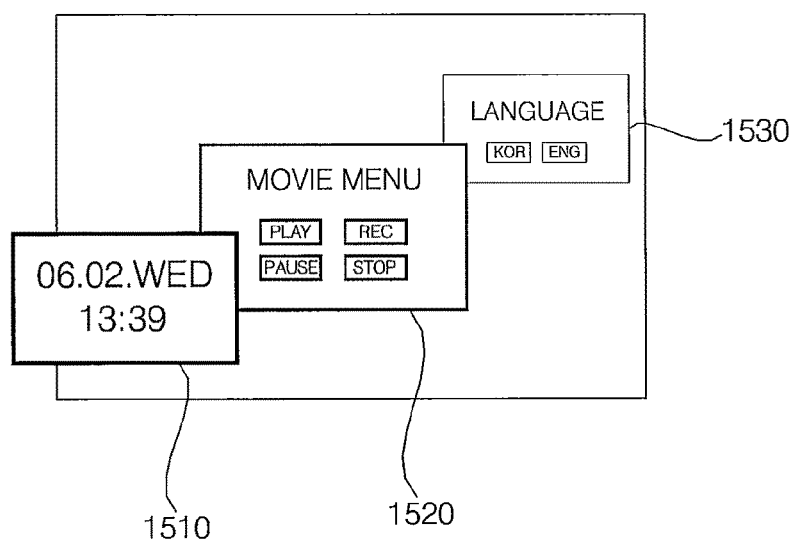

FIGS. 17 and 18 illustrate 3D OSD objects displayed with an enhanced sense of perspective in the image display apparatus according to an exemplary embodiment of the present invention.

FIG. 17 illustrates 3D OSD objects that are conventionally rendered to have a sense of perspective by use of their depths alone. OSD objects generated from the image display apparatus 100 may be controlled in brightness and/or sharpness to achieve an enhanced sense of perspective, like 3D objects included in an input 3D image.

Referring to FIG. 17, first, second and third 3D OSD objects 1510, 1520 and 1530 are displayed on the display 180. The depth value decreases in the order of the first, second and third 3D OSD objects 1510, 1520 and 1530. Therefore, the user feels the first, second and third 3D OSD objects 1510, 1520 and 1530 as nearer to the user in a descending order.

To enhance a sense of perspective, the controller 170 may differentiate the first, second and third 3D OSD objects 1510, 1520 and 1530 in sharpness.

Referring to FIG. 18, different sharpness levels as well as different depth values based on disparities are given to the first, second and third 3D OSD objects 1510, 1520 and 1530. The sharpness of a 3D object depends on its depth value. Thus, the display 180 displays the first 3D OSD object 1510 having the largest depth value most clearly, while it displays the third 3D OSD object 1530 having the smallest depth value least clearly. The display 180 displays the second 3D OSD object 1520 having a depth value between the depth values of the first and third 3D OSD objects 1510 and 1530, less clearly than the first 3D OSD object 1510 and more clearly than the third 3D OSD object 1530.

Accordingly, the user feels an enhanced sense of 3D effect due to a sense of perspective by sharpness added to a disparity and a depth illusion based on the disparity. Besides, control of a font size, a bold font, and/or the size of the window of a 3D OSD object according to the depth value of the 3D OSD object may contribute to improving a sense of perspective.

As is apparent from the above description, a sense of perspective or 3D can be enhanced by adding various effects when a plurality of objects having different depth values are displayed in the image display apparatus. Especially, the image display apparatus can maximize a sense of perspective that a user feels based on an empirical or learned fact about the perspective of objects by applying different brightness and/or sharpness levels to the objects. Therefore, as an object to appear as remote from the user is displayed obscure or dark, a sense of 3D that is hard to realize only with a disparity can be dynamically represented.

Further, the image display apparatus refers to a preset database of image quality information mapped to depth values or depth information, which simplifies a computation for correcting an image or determining pixel values. In addition, when the brightness of an object is controlled according to the depth value of the object, a process of correcting an image or generating a new image can be omitted by controlling the brightness of the display, not pixel values.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus, comprising:
   receiving motion information from a remote controller;
   determining a movement of the remote controller based on the motion information;
   calculating coordinates of a pointer;
   receiving an image including at least one three-dimensional (3D) object;
   generating an on-screen display (OSD) signal, including the pointer;
   converting the OSD signal to a 3D OSD signal;
   calculating a depth value of the at least one 3D object and a 3D pointer corresponding to the pointer;
   changing at least one of sharpness and brightness of pixels corresponding to the at least one 3D and the 3D pointer object according to the depth value and generating an output image including the changed at least one 3D object and the 3D pointer; and
   displaying the output image,
   wherein the calculating step comprises:
      receiving a left-eye image data and a right eye image data of the 3D object;
      calculating edges of the left-eye image data and the right eye image data;
      detecting starting pixels and ending pixels of the edges;
      calculating a shift value between the starting pixels of the edges detected from the left-eye image data and right-eye image data, and a shift value between the ending pixels of the edges detected from the left-eye image data and right-eye image data;
      calculating a disparity between the left-eye image data and right-eye image data of the 3D object using the edge shift values; and
      calculating the depth value of the 3D object using the calculated disparity, and
   wherein the changing step changes the at least one of the sharpness and brightness of pixels corresponding to the 3D object and the pointer according to the depth value on a block basis using an image information table,
   wherein at least one of sharpness and brightness of pixels corresponding to the 3D OSD is changed according to depth value of the 3D OSD, and
   wherein the 3D pointer is shifted by the movement of the remote controller.

2. The method according to claim 1, further comprising setting an image quality parameter for the at least one 3D object according to the depth value,
   wherein the output image generation comprises changing the at least one of the sharpness and brightness of the pixels corresponding to the at least one 3D object according to the image quality parameter.

3. The method according to claim 2, wherein the image quality parameter includes at least one of a brightness parameter, a sharpness parameter, a color parameter, and a contrast parameter for the pixels corresponding to the 3D object.

4. The method according to claim 1, wherein the output image generation comprises generating the output image by increasing the sharpness of the pixels corresponding to the at least one 3D object if the depth value is larger, and decreasing the sharpness of the pixels corresponding to the at least one 3D object if the depth value is smaller.

5. The method according to claim 1, wherein the output image generation comprises generating the output image by increasing the brightness of the pixels corresponding to the at least one 3D object if the depth value is larger, and decreasing the brightness of the pixels corresponding to the at least one 3D object if the depth value is smaller.

6. The method according to claim 1, wherein the at least one 3D object includes a left-eye image and a right-eye image and the depth value calculation comprises calculating the depth value of the at least one 3D object according to a disparity between the left-eye and right-eye images of the at least one 3D object.

7. The method according to claim 1, further comprising changing a brightness of backlights at a position where the at least one 3D object is displayed according to the depth value of the at least one 3D object,
   wherein the brightness of the backlights is increased if the depth value is larger and decreased if the depth value is smaller.

8. An image display apparatus comprising:
   a user input interface configured to receive a control signal from a remote controller;
   a video signal receiver configured to receive an image including at least one three-dimensional (3D) object;
   a controller configured to determine a movement of the remove controller based on the motion information, calculate coordinates of a pointer, calculate a depth value of the at least one 3D object, change at least one of sharpness and brightness of pixels corresponding to the at least one 3D object and the 3D pointer according to the depth value, and generate an output image including the changed at least one 3D object and the 3D pointer; and a display configured to display the output image, wherein the controller is further configured to:

receive a left-eye image data and a right eye image data of the 3D object;

calculate edges of the left-eye image data and the right eye image data;

detect starting pixels and ending pixels of the edges;

calculate a shift value between the starting pixels of the edges detected from the left-eye image data and right-eye image data, and a shift value between the ending pixels of the edges detected from the left-eye image data and right-eye image data;

calculate a disparity between the left-eye image data and right-eye image data of the 3D object using the edge shift values;

calculate the depth value of the 3D object using the calculated disparity; and change the at least one of the sharpness and brightness of pixels corresponding to the 3D object and the 3D pointer according to the depth value on a block basis using an image information table, wherein at least one of sharpness and brightness of pixels corresponding to the 3D OSD is changed according to depth value of the 3D OSD, and wherein the 3D pointer is shifted by the movement of the remote controller.

9. The image display apparatus according to claim 8, wherein the controller sets an image quality parameter for the at least one 3D object according to the depth value and changes the at least one of the sharpness and brightness of the pixels corresponding to the at least one 3D object according to the image quality parameter.

10. The image display apparatus according to claim 9, wherein the image quality parameter includes at least one of a brightness parameter, a sharpness parameter, a color parameter, and a contrast parameter for the pixels corresponding to the 3D object.

11. The image display apparatus according to claim 8, wherein the controller generates the output image by increasing the sharpness of the pixels corresponding to the at least one 3D object if the depth value is larger, and decreasing the sharpness of the pixels corresponding to the at least one 3D object if the depth value is smaller.

12. The image display apparatus according to claim 8, wherein the controller generates the output image by increasing the brightness of the pixels corresponding to the at least one 3D object if the depth value is larger, and decreasing the brightness of the pixels corresponding to the at least one 3D object if the depth value is smaller.

13. The image display apparatus according to claim 8, wherein the at least one 3D object includes a left-eye image and a right-eye image and the controller calculates the depth value of the at least one 3D object according to a disparity between the left-eye and right-eye images of the at least one 3D object.

14. The image display apparatus according to claim 8, wherein the display includes backlights having a changed brightness at a position where the at least one 3D object is displayed according to the depth value of the at least one 3D object, and wherein the display increases the brightness of the backlights if the depth value is larger and decreases the brightness of the backlights if the depth value is smaller.

15. The method according to claim 1, wherein the shift value calculating step comprises identifying a shape of the at least one 3D object.

16. The image display apparatus according to claim 8, wherein the controller is further configured to identify a shape of the at least one 3D object.

\* \* \* \* \*